United States Patent [19]

Leestemaker

[11] Patent Number: 5,001,331

[45] Date of Patent: Mar. 19, 1991

[54] SYSTEM FOR ESTABLISHING PRODUCTION HISTORY

[75] Inventor: Harm W. Leestemaker, Ls Amelo, Netherlands

[73] Assignee: Ten Cate Protect BV, Netherlands

[21] Appl. No.: 319,160

[22] Filed: Mar. 6, 1989

[30] Foreign Application Priority Data

Sep. 24, 1986 [GB] United Kingdom ............... 8622980

[51] Int. Cl.⁵ .................. G06F 15/20; G06K 7/10
[52] U.S. Cl. ......................... 235/375; 235/449; 235/493; 57/901; 364/470
[58] Field of Search .............. 235/375, 493, 385, 435, 235/440, 449; 57/901; 524/431; 252/62.53, 62.54; 360/1, 137; 364/470

[56] References Cited

U.S. PATENT DOCUMENTS 3,019,385  1/1962  Kalbfell ........................... 360/1 X
3,126,924  3/1964  Kirkpatrick .................... 57/901 X
4,673,803  6/1987  Zerle et al. .................... 235/375 X Primary Examiner—Stuart S. Levy
Assistant Examiner—Steven M. DuBois
Attorney, Agent, or Firm—Locke & Reynolds

[57] ABSTRACT

A system for establishing the manufacturing and/or production history of textile material (1) being produced in strip or sheet form, in which magnetizable data carrier means (4,5) is incorporated in the strip or sheet material during the production thereof; means (8) for magnetically implanting information characteristic of and/or relating to materials used and production and manufacturing conditions prevailing at predetermined operation stations, machines, locations or the like along the route taken by the textile material during the production thereof; and means (9) for reading or otherwise interrogating the magnetizable means or material for the purposes of deriving from said information/data signals utilizable for establishing said manufacturing and/or production history.

16 Claims, 1 Drawing Sheet

SYSTEM FOR ESTABLISHING PRODUCTION HISTORY

CROSS-REFERENCE TO RELATED APPLICATIONS

This application is a continuation of International Patent Application Number PCT/GB87/00671, filed Sept. 24, 1987.

BACKGROUND OF THE INVENTION

This invention relates to a system and apparatus for enabling the establishment of the production history of materials subjected to a continuous process operation or to successive process operations.

In particular, the present invention is concerned with being able to establish i.e., trace, the production history of lengths, pieces; cut-lengths or the like of materials which have initially been produced in continuous strip or continuous length form.

A particular requirement for establishing production history arises in relation to the production of knitted, woven and/or non-woven fabric which, during production thereof is subjected to a large number of process operations and treatments, and which following the production is usually separated lengthwise into many pieces or cut-lengths of possibly highly variable cut-length. Often the pieces are attached together to form large bundles of cut-lengths having different initial production histories since they have been produced on different weaving or knitting machines and/or from different raw material batches.

As is very well known, fabrics whether knitted, woven or non-woven, are made from a large number of different materials such as, for example, natural fibers, man-made fibers, yarns or the like, and mixtures of natural and man-made fibers.

The natural materials can include materials such as wool, cotton, flax, and jute whilst man-made fibers or yarns made from natural or synthetic materials can include materials such as viscose rayons, cuproammonium viscose (both of the latter being made from natural materials) or synthetic materials such as polymers. The yarns whatever their origin can be spun from fibers of finite length or from fibers of infinite length. The finite length fibers are commonly called staple fibers whilst those of infinite length are termed filament fibers.

A yarn may comprises single fibers which are of the same thickness or may comprise fibers of different thicknesses.

Woven, non-woven and knitted fabrics (hereinafter collectively referred to as "fabrics") are made from specific yarns, with respect to their raw materials and fiber form with the yarns interlacing with a specific density and in a special or specific manner Following the fabric forming operation most fabrics will require finishing operations to be effected thereupon. Such operations usually involve mechanical and-/or chemical treatments which are intended to achieve the particular or specific desired properties for the finished fabric. These chemical and mechanical treatments can include, for example, singeing to burn-off protruding ends of individual fibers; desizing to remove starches which had been required during the weaving process; various wet stages including, for example, washing, bleaching, dyeing, and printing and other forms of after treatment such as preshrinking, stabilizing, wash-and-wear treatments etc.

In practice, pieces of fabric which have been subjected to different treatments in previous treatment stages maybe brought together to form batches for the purposes of carrying out one or more further treatments upon the assembled batches, such batches may be separated and mixed in different combinations for the purposes of additional treatment operation or operations.

It will thus be understood that for the purposes of process and quality assurance reasons it is very important to be able to keep a record i.e., keep-track-off, of every piece of fabric in respect of manufacturing data, the origin of the fiber yarns, the various process stages and treatments etc., that the particular piece of fabric has received, by which machine or machines, and which process operations have been effected on the piece of fabric.

Also, in the case of sub-standard pieces of fabric commonly called "seconds" it is important to be able to identify and establish the manufacturing history of the pieces of Fabric in question. In particular, for establishing where, how, and why during the production process the fabric piece was reduced to a sub-standard condition.

In the particular case of the manufacture of textile materials it is a well known problem to be able uniquely to recognize, that is identify, a specific piece of material so as to be able to establish upon which production machine it had been made; from which yarn batch or mixture the fabric arises; what was the finishing treatment route through which the fabric passed; when the fabric piece passed through that route; what was the finishing program prescribed for the material and so on. It will be understood that it is the answers to questions such as those mentioned that enable unique identification of the fabric piece and establishment of its manufacturing history to which subsequent reference may be made.

It is an object of the present invention to provide means for and a method of facilitating the establishment of the history and/or identification of a piece of fabric or other continuously produced material which is likely to be separated into cut-lengths for subsequent manufacturing treatments or use.

SUMMARY OF THE INVENTION

In accordance with a first aspect of the present invention there is provided a method for enabling the manufacture and/or production history of textile material being produced in strip or elongate form to be established, characterized by the step of providing the textile material during the initial stages of the manufacture and/or production thereof with selectively magnetizable means in fiber, filament, fleece, thread, yarn or the like form and capable of being selectively magnetized to provide carrier means for recordal of information/data and being woven or otherwise incorporated into the textile material in such manner that it forms an integral part of the textile material without changing the intended basic properties and/or function of the textile material whereby information/data relating to materials used for an/or in relation to the textile material and predefined manufacturing and/or production situations, processes, treatments or the like to which the textile material together with the magnetizable information/data carrier means have been simultaneously subjected may be magnetically recorded onto the magnetizable carrier means for subsequent interrogation and read-out to produce output signals utilizable to establish said manufacturing and/or production history.

According to a second aspect of the present invention there is provided apparatus for establishing the manufacturing and/or production history of textile material being produced in strip or sheet form, characterized by; selectively magnetizable means in fiber, filament, fleece, thread, yarn or the like form and capable of being selectively magnetizable to provide carrier means for selectively recording of information/data woven or otherwise incorporated into the textile material during the initial stages of the production thereof in such manner that it forms an integral part of the textile material without changing the basic properties and/or function of the textile material; means for magnetically implanting into the magnetizable carrier means information characteristic of and/or relating to materials used for and/or in relation to production and/or manufacturing conditions prevailing at predetermined operation stations, machines, locations or the like along the route taken by the textile material during the production thereof; and means for reading or otherwise interrogating the magnetizable carrier means for the purposes of deriving, from said information/data, signals utilizable for establishing said manufacturing and/or production history of the textile material.

If the magnetizable yarns comprise partly magnetizable textile fibers it is preferred to concentrate the segregation of the magnetizable fibers often dark colored at the center of the core of the yarn.

The magnetizable fibers can be textile fibers coated with magnetizable materials or man-made textile fibers incorporating the magnetizable materials.

The data carrier means can be incorporated into the textile into or near the selvedge or the selvedges of the piece of textile.

The magnetizable fibers can be textile fibers coated with magnetizable material. Man-made textile fibers can incorporate the magnetizable materials into the spinning melt or dope whereby the magnetizable materials are automatically incorporated into the fibers during the spinning of the fibers.

Preferably, but not limited to, the magnetizable fibers comprise artificial cellulosic fibers of modified viscose rayon often called High Wet Modulus (HWM), Modal rayon, or synthetic fibers such as polyester, incorporating magnetizable particles of materials such as magnetizable metal oxides, such as oxides of Iron, Chromium, Iron and Cobalt, Iron and Chromium, and also polymeric oxide etc. In particular, the magnetizable materials can be those used in the manufacture of data carrying tapes, discettes and discs for computers, audio and video recorders. In particular, materials such as $CrO_2$ and $Fe_2O_3$ and $Fe_2O_4$ which can be milled to a very small particle size may be used.

All man-made fibers, such as polyester, viscose, modal, polyaramide and polyimide in filament or staple form, can be used by incorporating the metal particles in the spinning solution or melt.

Other ways to add the metal-oxides to the fibers are the coating of the fibers, bicomponent spinning techniques etc.

It was surprisingly found that on incorporating the above-mentioned magnetizable materials into fibers, spinning the fibers into yarns and incorporating these yarns into a fabric, a data carrying means was produced, which can carry data which can be accessed when required to establish the manufacturing history of any fabric including these yarns.

For a better understanding of the invention and to show how to carry the same into effect features of the invention will be considered in relation to specific examples of implantation of data-carrier or data recording means into a fabric in accordance with the invention.

In a first example of the system of invention it will be presumed that a fabric comprising a blend of 65% polyester staple fibers and 35% cotton fibers is to be produced.

As a first stage in the application of the concepts of the invention a data carrier is formed by a yarn spun from 65% polyester and 35% of a HMW viscose rayon incorporating between 10% to 50% by volume chromium dioxide particles.

The data carrier yarns thus produced are used as warp yarns and are woven into the selvedge or selvedges of the fabric.

With the provision of the data-carrier yarns as discussed a data-carrier facility is provided throughout the total length of the fabric. Consequently, no matter how many cut lengths or pieces that are produced from the total length of the fabric by dividing the woven material across the width of the fabric each such fabric piece or length will incorporate along the selvedge or selvedges thereof the data-carrier yarns.

With a view to enhancing the recording capability of the data carrier properties of the fabric the latter is woven so that it has a weave (interlacing) such that when the data carrier yarns are used as warp yarns they will have relative to the other warp yarns of the fabric relatively large floats of, for example, four to six up and down.

BRIEF DESCRIPTION OF THE DRAWINGS

For a better understanding of the invention reference will be made to the accompanying drawings in which.

DESCRIPTION OF THE PREFERRED EMBODIMENTS

Figure 1:
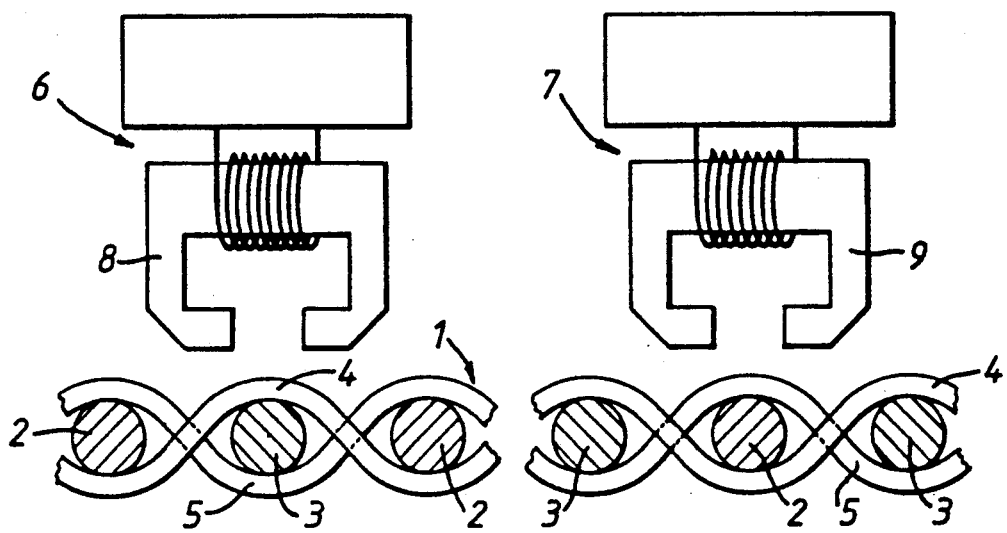
FIG. 1 very schematically illustrates to a very large scale a textile material adapted for use with a system incorporating the concepts of the invention, the figure showing an outline of the system.

Referring to FIG. 1 this shows in a very diagrammatic manner a fragmentary sectional view of a continuous length of textile material 1 at some point in the route or path it follows during the production of the textile material. It will be assumed that the material is advancing in the direction from left to right in the Figure. The textile material incorporates weft yarns 2 and 3 and warp yarns 4 and 5. The Figure depicts a very simple weave for the textile material. As shown in the Figure the yarn 5 is located behind the yarn 4 in the direction lengthwise of the weft yarns 2 and 3. With the weave shown in Figure the yarn 4 passes below the yarns 2 and above the yarns 3, whilst the yarn 5 passes below the yarns 3 and above the yarn 4.

In accordance with the proposals of the invention the warp yarns 4 and 5 are formed by yarns incorporating magnetizable material, that is the above mentioned data carrier yarns.

A data transmitting unit 6 and a data read-out or detecting unit 7 are positioned above the material 1 in spaced apart relationship to each other The data transmitting unit 6 includes a magnetic recording head 8 which is of such construction that it is able to bridge the data carrier yarns 4 and 5 and is also such as to be able to produce a recording signal which is able operationally to penetrate as deep as possible into the fabric so that if possible those parts of the yarns that are beneath a weft yarn 2 or 3 are subjected to the recording signals emitted by the recording head 8.

It is convenient to note that the units 6 can, if desired, be capable of a signal receiving function and/or be capable of providing a signal recording function. However, for the purposes of description they will be discussed in terms of a capability of controlling the operation of the associated recording head 8.

The detecting unit 7 incorporates a magnetic signal read-out head 9 which is of such construction as to be able to operationally cooperate the data carrier yarns 4 and 5 and also, as far as possible, be responsive to the state of magnetization of as much as possible of the length of the warp yarns 4 and 5. In a particular practical arrangement where four such warp yarns were used the heads used were able operationally to cooperate with the four data carrier yarns provided.

In a first embodiment of a system incorporating the principles of the invention, in order to make use of the data-carrier yarn(s) provided in the fabric, data transmitting units 6 are provided at predetermined locations along the route or path through which the fabric travels during its manufacture and those finishing operations considered necessary for the specific purpose of the fabric.

It is proposed in this embodiment of the system to provide a data transmitting unit 6 at every weaving machine or with selected ones of the weaving machines involved. Each such unit 6 is arranged to transmit either continuously or intermittently a signal or signals characteristic of the machine with which it is associated. Each data transmitting unit is required to be able to record onto the data carrier For example, the data transmitted can be characteristic of the associated machine i.e., machine number or code, the date, time, machine stops, fabric codes or other information characteristics of a particular fabric etc., so that every piece of materials produced on that machine is uniquely identified or marked with sufficient detail to enable any length of material subsequently cut from the woven length to be linked with not only a particular machine but also the time at which the piece of fabric was manufactured whereby each such cut length is uniquely subsequently identifiable when the recorded data is subsequently read-out by a suitable read-out unit. A particular aspect of the system of the invention is the use of the data recording facility in combination with automatic fabric inspection-machines.

It is known that there are developments or requirements for high speed fabric inspection machines which are to be able to inspect fabrics automatically with computer linked sensors. In practice, it has been found that small failures in the fabric can be missed using a high speed inspection machine and that chances of failure are greatest if a production machine stops during a manufacturing run. To combat this problem it is proposed that production machine stop data which would be provided on the data-carrier yarn could be additionally used for the production of a control signal which can be utilized to slow down the operational speed of the inspection machine thereby to intensify the inspection.

It will be understood that data transmitter units 6 can also be placed at locations along the post weaving process treatment path of the fabric so that associated information data or the like relative to any post manufacture treatment stage can be implanted into the data carrier. For example, the date/time of the fabric approaching and leaving the machine can be implanted as desired on the fabric. In other words, data transmitting units may be installed at all of the major treatment plants or apparatus involved in the finishing of the fabric.

It is a feature of the system of the invention that at suitable locations during the production process data read-out arrangements can be provided for interrogating the data-carrier yarns so as to obtain output signals characteristic of the recorded data. With this arrangement it is possible to provide an integrated output which provides the manufacturing history of the fabric considered as a whole or as a cut length. In addition, the data read-out from the data carrier yarns can be combined with other data considered to be relevant to the manufacture of the textile material can be stored in a computer store or the like. The history can be provided as a computer type printout so that the history of a particular fabric length can be provided with each cut length.

Figure 2:
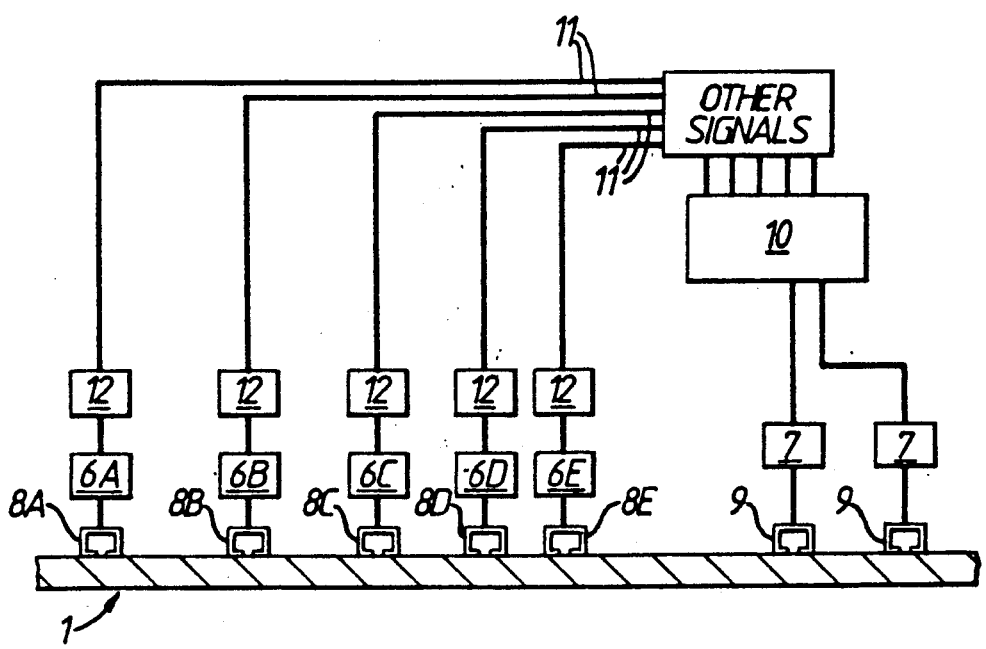
FIG. 2 very schematically illustrates in block diagram form a system incorporating the principles of the invention.

FIG. 2 very schematically illustrates in diagrammatic form the outline of a system providing the monitoring and control capabilities such as above mentioned. In the Figure a length of textile material 1 is shown during its travel along its production route or path. As is indicated data transmitting/receive/record units 6A, 6B, 6C, ... etc., and associated magnetic heads 8A, 8B, 8C, ... etc., are positioned at those locations of the the path or route at which it is desired to monitor and record data related to the conditions of the textile material or to record additional general information relating to the material. Thus, for example, the unit 6A is provided for recording details relating to the actual machine upon which the textile material has been woven. Units 6B and 6C are provided to record data relating to particular stages and operations in the production route or path.

Conveniently, the unit 6B is regarded as being representative of those recording units associated with "wet" processes and the unit 6C is regarded as being representative of "dry" processes or operations.

The unit 6D is generally indicative of the recordal of data relating to material control codes i.e., source, color codes, or any other information required for process and management controls or the like.

The unit 6E is intended to reflect the data arising from the inspection stages involved during manufacture, whilst the unit 6G is intended to be indicative of cutting data.

It will be understood that the introduction of any one unit 6 will essentially be a matter of choice according to the overall nature of the information it is considered necessary to be able to monitor and record.

At an appropriate location in the production path or route one or more detecting units 7 and associated magnetic read heads 9 is or are provided for detecting i.e., reading out the data recorded in the data carrier yarns 4 and 5 by the various units 6A, 6B ... etc. Each unit 7 is arranged to produce an output signal which is applied as input to a main control unit 10. This main control unit can be connected to receive additional data from other sources (not shown) and arranged to produce control outputs 11 which may if required be used operationally to control the apparatus or the like 12 with which the units 6A, 6B... etc., are associated. The control unit 10 can comprise any suitable form of computerized system which is arranged to operate on the data read-out and any other signals that may be involved according to requirements.

In a particular use of a simple system such as shown in FIG. 1 a data yarn was produced in the following manner: a modal fiber was spun with 40 wt% (of the total weight the fiber composition) of BayFerrox 8600 (manufactured by Bayer AG) into 3.3 Dtex fibers By means of a ring spinning system the modal fibers were spun into a 49 Tex yarn.

Four of these modal yarns were woven side-by-side into the selvedge region of a fabric of 100% cotton fibers.

A transmitting unit 6 incorporating inter alia a magnetic recording head 8 was positioned so that the head 8 could operationally cooperate with the four magnetizable yarns located in a selvedge of a textile material 1. A 300 Hz signal was transmitted to the magnetizable yarns whilst at the same time producing a relative displacement in the lengthwise direction of the selvedge between the head 8 and the material of 38 cms per second. It will be appreciated that the relative movement could be produced by movement of the material 1, movement of the heads, or a combination of both.

On operation of the read-out/detecting unit 7 the magnetic head 9 thereof detected the 300 Hz signal at a signal strength of 1.2 millivolts the signal having a form whereby information related to the initial transmitted signal was determined.

In further examples, the recording signal frequency was set at various frequency levels, for example, 200, 400, 600, 1000 Hz and in each case the read-out head 9 detected the signal and produced output from which the form of the input signal was readily established.

In addition, it was found that on varying the rates of relative translation between the textile material and the recording and read-out heads the resulting signal strength was substantially linearly related.

It was also found that the signal strength was related to the content of magnetizable material in the fibers of the yarns. Thus, for a magnetizable material content of 20 wt% of the total weight and a rate of 38 cms per second the signal strength was 0.7 millivolts.

In relation to the amount of the magnetizable material added to the dope from which the fiber is spun it has been found that the maximum acceptable amount is effectively an empirical limit set by the need to ensure that the amount of magnetizable material added does not excessively weaken the strength of the fiber to the extent that it is not capable of performing its intended use or otherwise fulfilling its intended application In this connection it is important to avoid the use of magnetizable particles which have a generally needle like particle shape and to use those with a non-needle like shape.

Furthermore, to avoid the risk that the addition of iron or other magnetizable oxides to a man-made fiber forming dope could cause unwanted chemical or other reactions with any of the materials utilized in the post weaving processes or operations carried out upon a textile material it is proposed to coat the particles of the magnetizable material with a material which is chemically resistant to materials used the various finishing processes involved with textiles.

Thus it is a feature of the invention to coat the particles of magnetizable material with a material which is resistant to the materials used in textile finishing operations. Such coating can be a polymer or glass coating, one such polymer being polyurethane.

With a view to improving the signal recording performance of the data carrier yarns it is proposed in accordance with a further feature of the invention to subject the magnetizable fibers during the spinning thereof to the effect of a magnetic field of such strength as to produce a predetermined magnetic orientation of the magnetizable material within the fibers. The applied magnetic filed can be such as to produce magnetic alignment of the magnetizable material in the axial direction or in the radial direction of the fibers.

Since, it is desirable to transmit the data in a form which is readily readable by microprocessor techniques the transmitted signals are preferably in digital form. The magnetization of the magnetizable material thus extends into the saturation regions of the material's hysteresis curve.

With the above method it is possible to enhance the monitoring of the production process, and provide a higher degree of control over the various stages of the process and over quality assurance.

In a further embodiment of the system the magnetizable filament polyester yarns which have been woven into a satin weave are carried upon a spool located adjacent to the selvedge warp yarn spools so that the satin woven data-carrier yarns can be effectively incorporated into the fabric being woven in the manner of a conductive tape located adjacent to the selvedge of the fabric. The tape is utilized in the manner above discussed.

It will be appreciated that whilst the above discussion has specified the use of warp yarns the data carrier yarns could be weft yarns.

Thus, for example, in a production process in which the fabric supplied from a weaving mill in the form of batches or bundles of individual standardized cut-lengths of the fabric, one or more strips or pieces each, for example, of 500 millimeters in length of fabric, having information, data-carrier or recording properties are woven or knitted into the weft direction of the fabric at the beginning and end location of each of said individual cut-length whereby on cutting the material to obtain the requisite cut-lengths each cut length has at each end thereof or at least one end a data-carrier strip or piece onto which the data transmitter units can record the associated data for subsequent reading by suitable data-reading apparatus provided at different places relative to the width of the fabric.

The provision of the data tapes or means enables any changes of batches of weft yarns, which can be from different manufacturers, to be located and recorded by way of data-carrier yarns inserted before changing It is useful to note that when using the data carrier yarns as above discussed it has been found that it is preferable to take such fabric settings for these yarns, i.e., yarn counts of the warp and/or weft in combination with the long floating weave and the ends and picks per centimeter, to arrange that the fabric geometry is such that no tension problems (mostly due to differential shrinkage) will occur during the mechanical and chemical finishing treatments.

Non-woven fabrics are made of staple and/or filament fibers. Hence the fibers are not spun into a yarn but are immediately transformed into a fleece which is bonded by any convenient known technique.

Thus, according to a further aspect of the invention, in relation to non-woven fabrics one or more information, data-carrier yarns are incorporated into the fleece at one or both edges of the non-woven fabric being produced.

During the conventional subsequent bonding process the information, data or the like carrier yarn will be bonded to the fleece thereby resulting in an information, data or the like carrier strip or strand being provided in the non-woven fabric.

In the above-mentioned examples of the use of yarn comprising solely or partly data carrier fibers have been considered. It will be understood that in all kinds of fiber web formation processes involved in the manufacture of non-woven fabrics a strip or strips of data-carrier staple fibers can be incorporated in the fleece without pre-spinning into a yarn.

Any such strip of individual fibers will be bonded to the fleece during the conventional subsequent bonding process thereby resulting in an information, data-carrier strip of individual data-carrier fibers in the non-woven fabric.

Whilst the above discussion has been specifically directed to the production of fabric the concepts of the invention can be applied to other production processes. For example, the concepts of the invention can be applied to the production of a paper web. As is well known the production of paper is a wet process. The fibrous material (predominently cellulosic) for producing the paper is established as an aqueous slurry and the slurry is deposited upon a paper forming mesh which allows the water to drain away leaving a web or layer of the paper forming material on the forming mesh. By incorporating a data-carrier fibrous yarn in the slurry, the yarn running lengthwise of the mesh the yarn can be incorporated into the paper web during the formation of the latter. It will be understood that when the paper web dries the data-carrier yarn will be integrally embedded in the paper. As has been discussed in relation to the fabrics, data transmitters and detectors can be provided at desired locations of the paper production processes that may be involved as the paper forming web is caused to leave the forming mesh.

What is claimed is:

1. A method for manufacturing a textile including a production history comprising the steps of:
   providing a selectively magnetizable means for recording information/data in a form selected from the group consisting of a fiber, filament, thread, and yarn;
   incorporating the magnetizable means continuously along a selected minor portion of a textile material in such manner that it forms an integral part of the textile material without changing the intended basic properties of the textile material; and
   recording information/data on the magnetizable means relating to at least one of the group consisting of materials used in the textile material, and predefined manufacturing processes to which the textile material together with the magnetizable means have been simultaneously subjected.

2. A method as claimed in claim 1 wherein the providing step comprises the steps of:
   selecting a magnetizable material which is at least initially in the form of a divided particulate, and introducing the magnetizable material into said fiber, filament, thread, or yarn.

3. A method as claimed in claim 1 wherein the providing step comprises the steps of:
   selecting a magnetizable material which is at least initially in the form of a divided particulate, and introducing the magnetizable material on the surface of said fiber, filament, thread, or yarn.

4. A method as claimed in claim 2 wherein the providing step further comprises the step of:
   forming said fiber, filament, thread, or yarn from man-made materials.

5. A method as claimed in claim 4 wherein the magnetizable material is introduced into the man-made materials during the production thereof.

6. A method as claimed in claim 5 wherein the forming step further comprises the step of:
   blending the magnetizable material in a melt of constituents from which said fiber, filament, thread, or yarn are to be formed.

7. A method as claimed in claim 6 further comprising the step of:
   subjecting the magnetizable means to a premagnetizing magnetic field during the forming step.

8. A method as claimed in either of claims 2 or 3 further comprising the step of:
   coating individual particles of the magnetizable material with a composition selected from the group consisting of a polymer and a glass.

9. Apparatus for establishing the production history of textile material comprising:
   magnetizable means for selectively recording information/data in a form selected from the group consisting of fiber, filament, thread, and yarn, incorporated continuously along a selected minor portion of the textile material during an initial stage of the production thereof in such manner that it forms an integral part of the textile material without changing the basic properties of the textile material; and
   means for magnetically implanting into the magnetizable means information characteristic of at least one of the group consisting of materials used for production of the textile material, and production conditions prevailing at predetermined operation locations, along the route taken by the textile material during the production thereof.

10. The apparatus of claim 9 further comprising means for interrogating the magnetizable means for the purposes of deriving, from said information/data, signals utilizable for reestablishing said production history of the textile material.

11. The apparatus of claim 9 wherein the textile material is elongated in a lengthwise direction and the magnetizable means is incorporated in the lengthwise direction of the elongate textile material.

12. The apparatus of claim 11 wherein the magnetizable carrier means extends continuously in the lengthwise direction of the textile material.

13. The apparatus of claim 9 wherein the textile material is elongated in a lengthwise direction and the magnetizable carrier means is located at spaced apart intervals lengthwise of the textile material.

14. The apparatus of claim 9 wherein the magnetizable means is incorporated into the material forming said fibers, filaments, threads, or yarns from which the textile material is produced.

15. Apparatus for establishing the production history of textile material comprising:

a textile material elongated in a lengthwise direction.

magnetizable means for selectively recording information/data in a form selected from the group consisting of fiber, filament, thread, and yarn, incorporated continuously along only a selected minor portion of the textile material during production thereof in such manner that it forms an integral part of the textile material; and means for magnetically implanting into the magnetizable means information characteristic of at least one of the group consisting of: materials used for production of the textile material, time of production, and production conditions prevailing at predetermined operation locations along the route taken by the textile material during the production thereof.

16. The apparatus of claim 9 wherein said selected minor portion of the textile material consists essentially of a selvedge region.

* * * * *